2,741,705

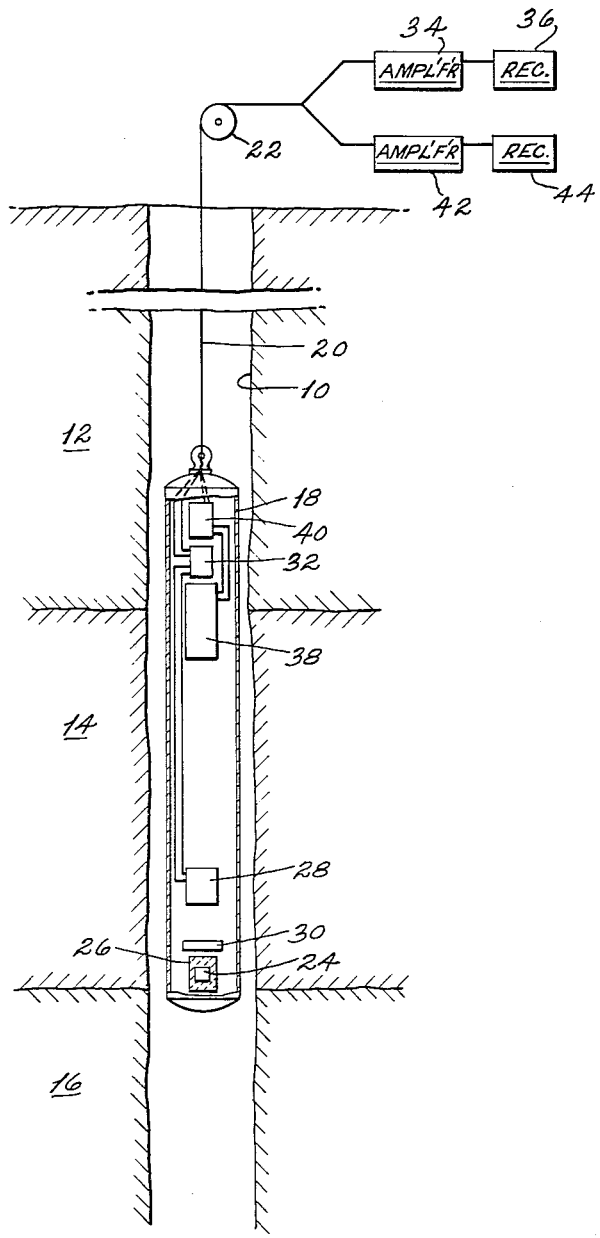

Patented Apr. 10, 1956

2,741,705

RADIOACTIVE WELL LOGGING

Alexander S. McKay, Bellaire, Tex., assignor to The Texas Company, New York, N. Y., a corporation of Delaware Application January 30, 1951, Serial No. 208,629

5 Claims. (Cl. 250—83.3)

This invention relates to a method and an apparatus for use in the logging of bore holes or wells to determine the nature of the various subsurface formations traversed by the hole. The principal object of the invention is the provision of means whereby information can be obtained which will clearly identify the material of which a formation is composed and which will, for example, show whether a formation contains salt water or hydrocarbon oil.

It is well known that much information can be obtained from subsurface strata through the use of radioactivity and in one method of logging the formations surrounding the bore hole the formations are bombarded with neutrons from a source passed through the hole, more or less of these neutrons being scattered within the bombarded formation with some of these scattered neutrons returning to the hole to strike a neutron detector disposed close to the source. It is known that when a formation contains hydrogen in the form of water or hydrocarbon oil more neutrons will be scattered, slowed down and returned to the immediate vicinity of the source than in the case where no hydrogen is present, and the amount of scattering and slowing down varies more or less directly with the amount of hydrogen in the formation. For these reasons a scattered neutron log or a neutron-neutron log, as it frequently called, will provide information as to the degree of porosity of the formations traversed by the hole.

It is also well known that certain elements have a much higher capture cross section for thermal neutrons, i. e., neutrons of low energy, than other elements. In other words, when one element is bombarded with neutrons a very large proportion of the neutrons may be absorbed in the formation containing that element and there will, therefore, be less scattering and fewer neutrons returned toward the source. Fortunately the more common elements in rocks have low capture cross sections while the rarer and usually more desirable elements often have large capture cross sections. Examples of elements with small capture cross sections are aluminum, silicon, oxygen, carbon, calcium and hydrogen, and examples of elements with large capture cross sections are cadmium, boron, mercury, gold, silver and iridium. Chlorine also has a large capture cross section for thermal neutrons. Thus for the ideal case of a source of only thermal neutrons and a detector of thermal neutrons the counting rate or response of the detector will enable one to determine the absorption power of any material which is interposed between the source and the detector. The practical neutron sources, however, such as mixtures of radium and beryllium or polonium and beryllium emit mostly neutrons having energies of several mev. A one or two inch layer of water or paraffin will slow down a portion of the neutrons to thermal energies but many of the neutrons will emerge from the layer being bombarded with much higher energies. This means that the counting rate or response of a thermal neutron detector when an appreciable amount of matter is interposed between the source and the detector is a function of the absorption of the matter and also of the amount of hydrogen which is present. If one can show that no hydrogen is present, then a decrease in detector response, other things being equal, would be indicative of the presence of an appreciable amount of an element having a large capture cross section for thermal neutrons.

In accordance with this invention an arrangement has been devised whereby one can differentiate between absorption effects due to the presence of hydrogen and absorption effects due to the pressure of an element having a large capture cross section for thermal neutrons. A pair of thermal neutron detectors preferably of the counter type are disposed together with a neutron source within a logging instrument housing. One of these detectors is disposed close to the neutron source so that the outer end of this detector will not be much farther from the source than the diameter of the bore hole being logged. The other detector is spaced vertically from the source so that the end of this detector closest to the source will be about twelve inches from the source in a small bore hole and a distance approximately three times the diameter of the hole from the source in a large bore hole. All of these source-to-detector distances will be shorter if the detectors are surrounded by an appreciable annular layer of hydrogenous material in the bore hole, the distance between the source and detector decreasing with the thickness of the layer up to a thickness of one or two inches when the inner counter becomes substantially insensitive to formation changes. Assuming that both detectors are disposed above the source at the distances indicated, a decrease in the response of the upper detector will indicate that either an element of large thermal neutron capture cross section is present or else that there is hydrogen present which completes the slowing down of some of the more energetic neutrons and so increases the probability of their capture or absorption before they can reach the upper detector. A simultaneous decrease in the response of the lower detector, i. e., the detector closer to the source would indicate the presence of an element with a large capture cross section since more of the thermal neutrons would be captured before they had a chance to diffuse back to the detector. However, a simultaneous decrease in the response of the upper detector and an increase in the response of the lower detector would indicate an increase in the thermal neutron density in the formation being bombarded and would be caused by the presence of an appreciable amount of hydrogen in the formation.

When logging a formation containing little or no hydrogen it is desirable to bombard the formation largely with slow neutrons and this may be accomplished either by using a radium-beryllium or polonium-beryllium source surrounded by two or three inches of paraffin or water or by using a photo neutron source surrounded by an inch of paraffin or water. If one is mainly interested in formations of, say, 40% porosity very little moderator would be needed around the source, the neutrons being slowed down in the formation itself due to the hydrogen content thereof. In many situations there will be an annular layer of hydrogenous material between the logging instrument and the wall of the bore hole. Under these conditions no moderator would be needed around the source which could then be disposed in the middle of a short neutron counter, as disclosed, for example, in the United States Letters Patent No. 2,443,731 granted June 22, 1948, to Gerhard Herzog and K. C. Crumrine.

It is also contemplated that the arrangement of source and detectors which has been described can be used for searching for uranium or any other material which has a reasonably large fission cross section with neutrons. Thus supposing that the instrument was within a formation of quartz and the responses of both the upper and lower detectors were to increase, the presence of fissionable material in the formation would be indicated due to the general increase in the neutron flux since each neutron which is captured and causes fission will produce several additional neutrons.

For a better understanding of the invention reference may be had to the accompanying drawing in which the single figure is a vertical sectional view through a portion of a bore hole within which is suspended a logging instrument embodying the invention.

Referring to the drawing, a bore hole 10 is shown as penetrating several subsurface formations such as those indicated at 12, 14 and 16. The bore hole may either be cased or uncased since the presence of the ordinary well casing will not cause an appreciable loss in the radiation passing through it. Within the bore hole is an instrument housing 18 suspended from the surface by means of a suitable reel or cable measuring device 22 which provides at any instant a measurement of the amount of cable payed out and thus the depth of the instrument in the bore hole. Within the instrument housing 18 and shown near the bottom thereof is a neutron source 24 which may comprise a mixture of radium and beryllium. This source is preferably surrounded with a layer 26 of a substance such as paraffin capable of slowing down the neutrons emitted from the source. Directly above the source 24 is a slow neutron detector 28 and while any suitable detector may be used, it is preferred to use a device such as a boron tri-fluoride counter or a counter in which the cathode electrode is coated with a substance such as boron carbide from which alpha particles will be ejected when bombarded by slow neutrons. Between the source 24 and detector 28 is a shielding layer 30 of a substance such as cadmium having the property of absorbing those neutrons emitted by the source 24 and slowed down in the layer 26 and which would otherwise travel directly to the detector. The upper end of the counter 28 should preferably not be much farther from the source 24 than the diameter of the bore hole. The output of the counter 28 is led to a preamplifier 32 which is connected in turn to the cable 20 and at the surface to a suitable amplifier 34 the output of which passes to an indicating or recording device 36.

Also disposed within the instrument housing 18 and spaced vertically from the detector 28 is a second detector 38 preferably also of the counter or electrical pulse producing type. The output of this detector is led to a preamplifier 40 which is connected to the cable 20 and at the surface to an amplifier 42 and an indicator or recorder 44. The lower end of the detector 38, that is, the end toward the neutron source is preferably at least 12 inches from the source where the hole 10 is of small diameter, say, around 4 inches, and at a distance from the source at least three times the hole diameter when the bore hole being logged is of larger diameter.

It is believed that the operation will be clear from the foregoing explanation. However, to summarize this and assuming that the instrument 18 is being pulled upwardly through the hole and has passed from the formation 16 into the formation 14 a decrease in the response of the detector 38 would indicate that the formation 14 contains an element of large thermal neutron capture cross section such, for example, as silver or iridium or else that there is more hydrogen present and thus greater porosity in the formation 14 than in the previously traversed formation 16. If at the same time that a decrease is noted in the response of the detector 38, a decrease is also noted in the response of detector 28, the presence of an element in the formation 14 having a large capture cross section for thermal neutrons would be indicated rather than that the formation 14 contained more hydrogen than the formation 16. This is due to the fact that more of the thermal neutrons would be captured before they had a chance to scatter back to the detector 28. On the other hand, a simultaneous decrease in the output of detector 38 and an increase in the output of detector 28 would be indicative of a higher thermal neutron density in the vicinity of the source and detector 28 in the formation 14, than in the formation 16 and this would be caused by the present of more hydrogen and thus a higher porosity in the formation 14 than in formation 16.

In the logging of well bore holes it is, of course, very desirable to ascertain whether or not a porous formation contains salt water or hydrocarbon oil. Since the chlorine in salt water has a larger capture cross section for thermal neutrons, the arrangement which has been described has particular application in the determination as to whether a formation such as 14 contains salt water or hydrocarbon oil. Assuming that it has been determined that the formation 14 is a porous sand but it is not known whether the pores contain salt water or hydrocarbons, a simultaneous decrease in the response of detectors 28 and 38 will indicate that salt water rather than hydrocarbon oil is present. The formation 14 may contain both salt water and hydrocarbon oil, the oil, of course, floating upon the water. It will be clear that with this invention the position or depth within the formation 14 of the interface between the water and oil can be determined since when the instrument passes from the water-containing portion of the sand to the oil-containing portion the response or output of the detector 28 will increase while the response of the upper detector 38 will remain substantially the same as when the salt water bearing portion of the sand was being traversed.

In logging operations one is, of course, not too interested in determining the degree of salinity of the water although this information may, of course, be valuable in some instances, as in connection with the interpretation of electrical logs. One is more interested in determining the porosity and to know whether the formations contain water or hydrocarbons. It is well known that in scattered neutron logging hydrocarbons behave identically with respect to the neutrons as does fresh water. It is also well known that below a depth of 40 to 50 feet fresh water is almost never encountered. Thus the waters in oil-producing formations are not fresh and are saline to varying degrees. For these reasons, where the water contains any appreciable amount of salt, i. e., chlorine, the invention which has been described will be useful in detecting or locating the interface between water and oil in producing sands.

As has been explained in the foregoing, the arrangement which has been described can be used in exploring for uranium or other fissionable materials. Assuming, for example, that the formation 14 is a formation of quartz, the presence of fissionable material would be indicated if the response of both detectors 28 and 38 increases as the instrument passes from the formation 16 or the formation 12 into the formation 14. This is due to the fact that because of fission several additional neutrons are produced for each captured neutron which produces the fission.

Obviously many modifications and variations of the invention hereinbefore set forth may be made without departing from the spirit and scope thereof, and only such limitations should be imposed as are indicated in the appended claims.

I claim:

1. The method of logging formations traversed by a well bore hole which comprises bombarding said formations with neutrons from a source passed through the hole, measuring in a zone no farther from the source than the diameter of the bore hole the intensity of neutrons scattered in the formations and back to said zone, simultaneously measuring the intensity of neutrons scattered back to a second zone spaced vertically from said source by a distance approximately three times the diameter of the bore hole and comparing the measured intensities at the two zones to determine characteristics of said formations.

2. The method of logging formations traversed by a well bore hole which comprises bombarding said formations with neutrons from a source passed through the hole, measuring in a zone no farther from the source than the diameter of the bore hole the intensity of neutrons scattered in the formations and back to said zone, simultaneously measuring the intensity of neutrons scattered back to a second zone spaced vertically from said source by a distance approximately three times the diameter of the bore hole and comparing the measured intensities at the two zones to determine characteristics of the formations, such as whether a formation being bombarded is relatively porous or whether it contains a substance having a high capture cross section for neutrons, whether said formation contains salt water or hydrocarbons, or whether said formation contains fissionable material.

3. The method of logging the formations traversed by a well bore hole to determine the presence therein of fissionable materials, which comprises bombarding said formations with neutrons from a source passed through the hole, measuring in a zone not farther from the source than the diameter of the hole the intensity of neutrons scattered in the formations and back to said zone, simultaneously measuring neutrons scattered back to a second zone spaced vertically from said source by a distance approximately three times the diameter of the bore hole, and comparing the measured intensities at the two zones, a simultaneous increase in intensity at the two zones as the source moves from one formation to another indicating a general increase in neutron flux at both measuring zones and therefore the presence of fissionable material in the formation into which the source is moved.

4. The method of logging a porous formation traversed by a well bore hole to determine the position of the interface between salt water and hydrocarbon oil which comprises bombarding the lower portion of said formation with neutrons from a source passed upwardly through the hole while measuring in a first zone spaced from said source a distance approximately equal to the diameter of the bore hole the intensity of neutrons scattered in said formation portion and back to said zone, simultaneously measuring neutrons scattered back to a second zone spaced vertically from said source by a distance approximately three times the diameter of the bore hole, repeating this operation as the source moves into the upper portion of the formation, comparing the measured intensities at the two zones in each formation portion, an increase in the measured intensity in the first zone without an increase in the measured intensity in the second zone indicating that the source is passing the interface between salt water and hydrocarbon oil, and noting the depth of the source in the hole when said increase in measured intensity in the first zone occurs.

5. A bore hole logging apparatus comprising an instrument housing adapted to be passed through the hole while suspended from the surface on a cable, a source of neutrons and two detectors of slow neutrons vertically aligned within said housing, the outer end of the first detector being at a distance from the source not greater than the diameter of the hole and the inner end of the second detector being at a distance from the source not greater than three times the diameter of the hole, and means for indicating the intensities of scattered neutrons measured by said detectors in correlation to the depth of the instrument housing in the hole.

References Cited in the file of this patent

UNITED STATES PATENTS

| | | |
|---|---|---|
| 2,220,509 | Brons | Nov. 5, 1940 |
| 2,469,461 | Russell | May 10, 1949 |
| 2,469,462 | Russell | May 10, 1949 |
| 2,499,311 | Herzog et al. | Feb. 28, 1950 |